Patented May 4, 1937

2,079,216

UNITED STATES PATENT OFFICE 2,079,216

IMPROVED ACID SYNTHESIS PROCESS

Alfred T. Larson, Wilmington, Del., assignor to E. I. du Pont de Nemours & Company, Wilmington, Del., a corporation of Delaware No Drawing. Application March 25, 1933, Serial No. 662,854

4 Claims. (Cl. 260—116)

This invention relates to an improved process for the preparation of organic acids by the interaction of olefinic hydrocarbons with carbon monoxide and more particularly to the materials of construction in which such organic acid syntheses are conducted.

Mixtures of unsaturated hydrocarbons have been exposed repeatedly with carbon monoxide in the presence or absence of water vapor, to the action of catalysts under conditions varying as to the nature of the catalyst and as to the temperature and pressure prevailing in the reaction, with the result that methane, liquid hydrocarbons, carbonyls, and/or products of the water-gas reaction have been obtained in greater or lesser amounts and in inverse proportion to the acid desired.

More recently, due, no doubt, to the development of more selective catalysts high yields of the desired products have been realized with a corresponding decrease in the production of the undesirable by-products. When employing these more selective catalysts, however, it has been found that their life is relatively short, while methane, polymerization products, and carbonyls are still present in annoying amounts.

An object of the present invention is to provide an improved process for the preparation of organic compounds of an acidic nature from olefinic hydrocarbons and carbon monoxide and steam by conducting the reaction involving these compounds in an environment which overcomes many of the above disadvantages. Another object of the present invention is to provide an improved acid synthesis process wherein the reactants or the products formed therefrom contact with metal surfaces which do not greatly accelerate by-product formation. A still further object of the invention is to provide improved acid synthesis from olefines, carbon monoxide, and steam in equipment fabricated from metals which do not favor polymerization of the olefinic hydrocarbons or form products with the reactants, such as carbonyls with carbon monoxide, or catalyze reactions such as the water-gas reaction, or deteriorate the catalytic mass employed. Other objects and advantages will hereinafter appear.

I have found that in order to avoid polymerization, excessive by-product formation, with its attendant loss of reactants, and at the same time in order to decrease catalyst deterioration, the various parts of the acid synthesis apparatus coming into direct contact with the reactants must be fabricated, or parts thereof which contact with the reactants plated, inner-lined, or otherwise treated with materials which under the high temperatures and pressures prevailing are effective in resisting such action. For the hot parts of the apparatus, i. e. all those parts with which the highly heated reactants contact with the apparatus, there may be employed, I have found, a graphite lining or other form of carbon capable of withstanding high temperature, the lining being held in place by a suitable pressure-resisting wall such, for example, as an alloy steel wall. Alloy linings may likewise be used consisting of one containing at least 95% copper or one containing a high percentage, e. g. 90% or better, of tantalum. Steels containing a high percentage of at least one of the following metals may likewise be employed for construction of the apparatus: manganese, tungsten, chromium, tantalum, and molybdenum and, although, in some instances, these steels may be employed unlined, the rapidity of catalyst deterioration, by-product formation, and the like is considerably inhibited by inner-lining them with the above specified metals or their alloys, and in many instances is entirely eliminated. The cooler parts of the apparatus may be fabricated of a low carbon steel containing an inner lining of copper, silver, glass, or enamel or of an unlined alloy, such as one containing, for example, approximately 95% copper, 4% silicon, and 1% manganese, or one containing approximately 58% nickel, 20% iron, 20% molybdenum, and 2% manganese. It is, of course, understood that it is unnecessary to build the complete conversion apparatus with a single material, for it is generally preferable to fabricate and/or line the portions of equipment which contact with the hot reactants with one material and those which contact with the cooler reactants and/or products formed with a different material. For example, an excellent pressure resisting metal for the construction of the catalytic reaction chamber and preheater thru which the reacting gases pass prior to entering the reaction chamber, may, with very good results, be constructed of an alloy steel having approximately the following composition: 18% chromium, 8% nickel, 72% iron, and the remainder carbon, manganese, sulfur, etc.,— while the apparatus which feeds the gaseous materials to the reaction chamber as well as the equipment utilized for condensing and recirculating the cooler products may be constructed of a low carbon steel with an inner lining of copper or silver.

Although the metals above referred to are capable of withstanding for no inconsiderable periods the rigorous conditions of very high temperatures and pressures encountered in the operation of such synthesis, I have likewise found that their period of usefulness can be still further extended by a substantially complete elimination of free oxygen from the mixture of reactants. It is believed that oxygen present in the system acts somewhat in the capacity of a catalyst which accentuates many of the undesirable conditions and reactions referred to. Moreover, its presence aids corrosion which, of course, is invariably present in acid synthesis processes and particularly when catalysts of an acidic nature are used. For most advantageous operation, therefore, of acid synthesis processes, even when conducting it in equipment prepared in accord with my invention, oxygen, in the free state, should be substantially entirely eliminated. A method and process for its elimination from the reactants is described in my copending application Ser. No. 651,858, filed January 14, 1933.

The following example will serve to illustrate one manner of carrying the invention into effect without limiting it in any way to the particular procedural steps therein disclosed.

An alloy steel catalyst tube, such as that specifically designated above and designed for resisting high pressure, containing an inner lining of copper, is partially filled with activated charcoal and after bringing the chamber and charcoal catalyst to approximately 325° C., a gaseous mixture containing, by volume, 95 parts of carbon monoxide and 5 parts ethylene, is passed into the chamber, at a pressure of approximately 700 atmospheres, together with sufficient steam to give a steam : carbon monoxide and ethylene ratio of 0.25, the steam being provided by injection of the appropriate amount of a 1% aqueous solution of ammonium chloride. A 75% yield of propionic acid is obtained with a surprisingly small amount of by-products, polymerization products, and other undesirable products.

From a consideration of the present invention, it will be realized that any acid synthesis processes, in which olefinic hydrocarbons are reacted with carbon monoxide and steam, conducted in apparatus constructed of metals and operated in the manner as hereinbefore described, will come within the scope of this invention without sacrificing any of its advantages.

I claim:

1. In the manufacture of synthetic aliphatic organic monocarboxylic acids by catalytic addition of carbon monoxide and water to olefinic hydrocarbons at elevated temperature and pressure, the step which comprises conducting the reaction in the substantial absence of oxygen in a vessel, the inner surfaces of which are lined with a metal containing at least 95% copper.

2. In the manufacture of synthetic aliphatic organic monocarboxylic acids by catalytic addition of carbon monoxide and water to olefinic hydrocarbons at elevated temperature and pressure, the step which comprises conducting the reaction in a vessel, the inner surfaces of which are lined with a metal containing at least 95% copper.

3. In the manufacture of synthetic aliphatic organic monocarboxylic acids by catalytic addition of carbon monoxide and water to olefinic hydrocarbons at elevated temperature and pressure, the step which comprises conducting the reaction in the substantial absence of oxygen in such a way that the reactants will come in contact only with materials of construction containing at least 95% copper.

4. In the manufacture of synthetic aliphatic organic monocarboxylic acids by catalytic addition of carbon monoxide and water to olefinic hydrocarbons at elevated temperature and pressure, the step which comprises conducting the reaction in such a way that the reactants will come in contact only with materials of construction containing at least 95% copper.

ALFRED T. LARSON.